I. DRIPPS.
Car-Wheels.
No. 153,548.
Patented July 28, 1874.
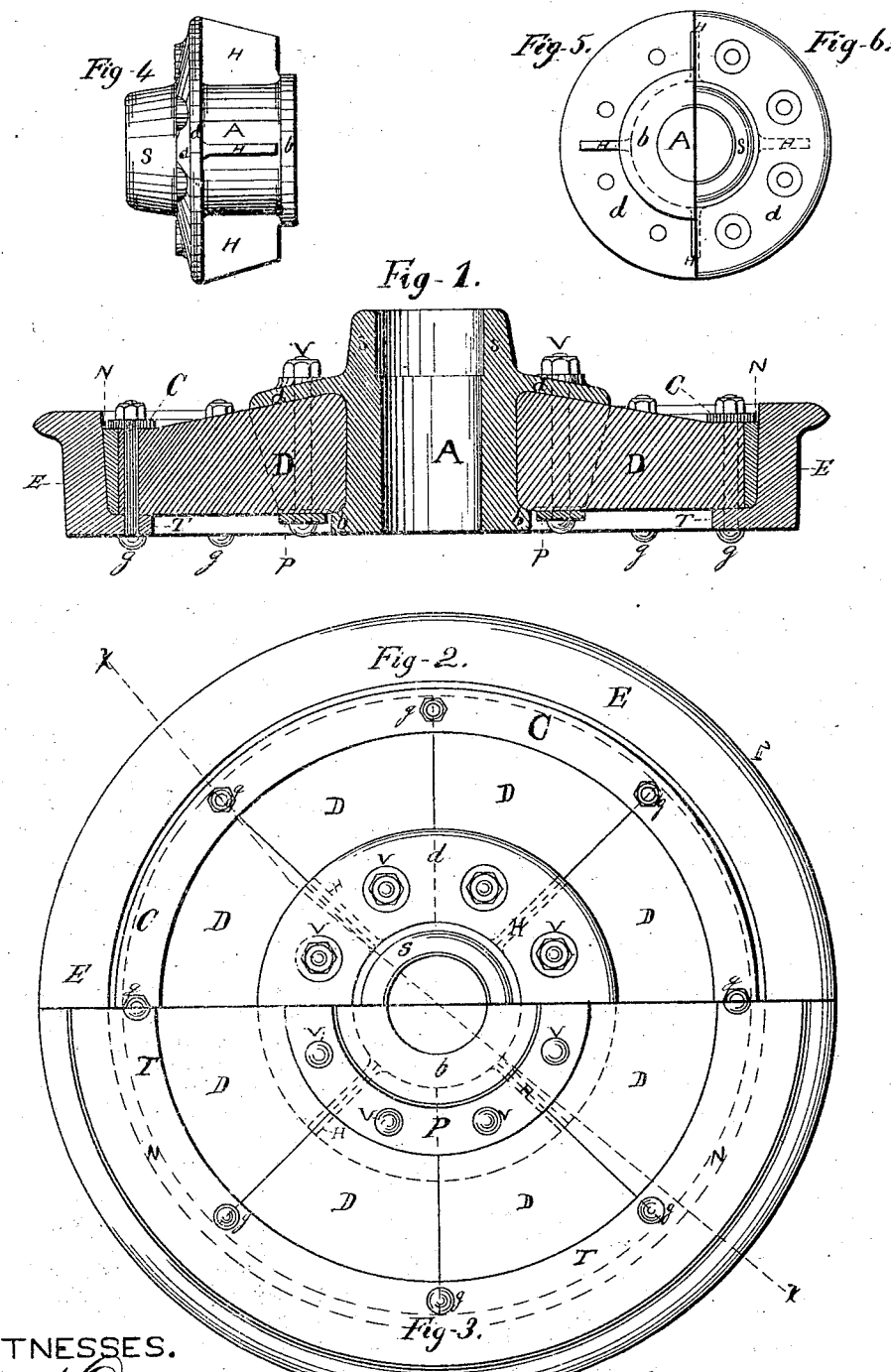
WITNESSES.
W. A. Dripps,
G. C. Dripps.
INVENTOR.
Isaac Dripps

UNITED STATES PATENT OFFICE.

ISAAC DRIPPS, OF PHILADELPHIA, PENNSYLVANIA.

IMPROVEMENT IN CAR-WHEELS.

Specification forming part of Letters Patent No. 153,548, dated July 28, 1874; application filed December 31, 1873.

*To all whom it may concern:*

Be it known that I, ISAAC DRIPPS, of Philadelphia, in the county of Philadelphia and State of Pennsylvania, have invented a new and useful Improvement in Railroad-Car Wheels; and I do hereby declare that the following is a full, clear, and exact description thereof, which will enable others skilled in the art to make and use the same, reference being had to the accompanying drawing forming part of this specification, in which drawing—

Figure 1 is a transverse section of my wheel by the line $x\ x$ of Figs. 2 and 3. Fig. 2 is a view of half of inner face of wheel. Fig. 3 is a view of half of outer face of same. Fig. 4 is a longitudinal elevation of hub. Fig. 5 is a view of half of outer face of hub. Fig. 6 is a view of half of inner face of same.

This invention relates to an improved wheel for railroad-cars, consisting of a combination of wood and metal, arranged in such a manner as will produce a more nearly perfect wheel than others of its class.

The hub A is constructed with a circular flange, $d$, projecting from the back part of body of hub, and a circular flange, $b$, on outer end of hub. Between the flanges $d$ and $b$ are raised ribs H, extending from the body of hub A to the top of the flange $d$, and sloping off to the flange $b$, and terminating some distance above it. The length of the ribs H above the flange $b$ to the flange $d$ is less than the distance between these two flanges, so that the wrought-iron ring P will always bear against the wooden segments D, forming the wooden body of wheel, and any shrinkage of the segment in the direction of their thickness can be taken up by the screw-bolts V. The objects of the ribs H are twofold—first, to strengthen the flange $d$, so as to resist the strain coming on this part of the wheel when passing around curves; and, second, to prevent the wooden segments D from turning on hub. On the inner end of the hub A is a sleeve or prolongation, S, of the hub over the axle, which closely fits it, and is designed to keep the wheel and axle in place and position, in case of the axle breaking at the shoulder, just inside of, or at, the inner end of the hub.

The wooden segments D, forming the body or center of wheel, may consist of any close-grained wood. The lower parts of the segments are fitted to the body of the hub A between the flanges $d$ and $b$, having a sufficient surface of wood bearing against the hub to prevent the wood from chafing and being compressed by weight of load.

When the wooden segments D are in place and forming a solid wooden center, the outside circumference or periphery of segments are turned off true, and a wrought-iron band, N, is heated and shrunk on, drawing all the segments close together, and holding them permanently in place. On this band H the tire E is fitted, and when the tire is worn out it can be taken off of ring and replaced by a new tire, without in any way injuring the wooden body of wheel. The outside face of the wrought-iron band N is turned conical, having its small or less diameter to the front face of the wheel. The inside face of tire E, having the same cone or taper, can be drawn tight on band N by the screw-bolts $g$.

All the different kinds of tire now in use can be used; but I prefer a tire, E, as shown on drawing, with a flange, T, on the outer edge of tire, extending inward from inside face of tire, of sufficient depth to allow the screw-bolts $g$ to pass through. The screw-bolts $g$ also pass through the wooden segments D and wrought-iron ring C, thus holding the tire very securely to the wooden body of wheel. The wrought-iron ring C bears against the inner face of the segments D, and inner edge of the band N, and is not in any way part of the tire, but is a bearing for the nut of the screw-bolts $g$. Near the hub A on outer face of wheel, bearing against the wooden segments D, is a wrought-iron ring, P, through which the screw-bolts V pass. The bolts V also pass through the wooden segments D and flange $d$, thereby very securely fastening the wooden segments D to the cast-iron hub A, and thus forming a complete practical wheel for railroad-cars.

I do not claim as new a metal hub provided with a circular flange, nor the combination of rings and wooden blocks or segments.

Having thus described my invention, I claim as new and desire to secure by Letters Patent—

1. The hub A, having the circular flanges $d$ and $b$, and transverse radial ribs H, as shown and described.

2. The combination, with the hub A, segments D, band N, ring P, and bolts V, of the removable metallic tire E, ring C, and bolts G, substantially as shown and described.

3. The wooden segments D, bound together and held permanently in place by the band N, in combination with the hub A, ring P, and screw-bolts V, substantially in the manner shown and described.

ISAAC DRIPPS.

Witnesses:
W. A. DRIPPS,
G. C. DRIPPS.